United States Patent
Liu et al.

(10) Patent No.: US 11,789,278 B2
(45) Date of Patent: Oct. 17, 2023

(54) WEARABLE DISPLAY DEVICE AND METHOD FOR ADJUSTING IMAGING SURFACE THEREOF

(71) Applicants: Beijing BOE Optoelectronics Technology Co., Ltd., Beijing (CN); BOE Technology Group Co., Ltd., Beijing (CN)

(72) Inventors: Bingxin Liu, Beijing (CN); Feng Zi, Beijing (CN); Lin Lin, Beijing (CN); Jiyang Shao, Beijing (CN); Binhua Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/790,410

(22) PCT Filed: Mar. 9, 2021

(86) PCT No.: PCT/CN2021/079730
§ 371 (c)(1),
(2) Date: Jun. 30, 2022

(87) PCT Pub. No.: WO2021/218401
PCT Pub. Date: Nov. 4, 2021

(65) Prior Publication Data
US 2023/0048475 A1    Feb. 16, 2023

(30) Foreign Application Priority Data
Apr. 27, 2020    (CN) .......................... 202010344312.X

(51) Int. Cl.
G02B 27/01    (2006.01)

(52) U.S. Cl.
CPC ..... *G02B 27/0176* (2013.01); *G02B 27/0179* (2013.01)

(58) Field of Classification Search
CPC .............. G02B 27/017; G02B 27/0172; G02B 27/0176; G02B 27/0179; G06F 3/011; H04N 23/66
See application file for complete search history.

(56) References Cited

U.S. PATENT DOCUMENTS

2013/0271619 A1*  10/2013  Longmore ............. H04N 23/66
                                                                        348/211.99
2014/0139637 A1    5/2014  Mistry et al.
(Continued)

FOREIGN PATENT DOCUMENTS

CN    104954682 A    9/2015
CN    107636682 A    1/2018
(Continued)

OTHER PUBLICATIONS

PCT/CN2021/079730 international search report.
(Continued)

*Primary Examiner* — Nitin Patel
*Assistant Examiner* — Cory A Almeida
(74) *Attorney, Agent, or Firm* — IPRO, PLLC

(57) ABSTRACT

Provided is a wearable display device. The wearable display device includes: a motor, a processor, and a motor drive assembly; wherein the processor is connected to the motor drive assembly, and is configured to receive a motor control instruction and send the motor control instruction to the motor drive assembly; the motor drive assembly is connected to the motor, and is configured to: control the motor to rotate based on the rotation mode in the case that the motor control instruction carries the rotation mode, and adjust a rotation speed of the motor based on the speed (Continued)

control parameter in the case that the motor control instruction carries the speed control parameter; and the motor, upon rotating, is configured to adjust a position of an imaging face of the wearable display device.

16 Claims, 4 Drawing Sheets

(56) References Cited

U.S. PATENT DOCUMENTS

| | | |
|---|---|---|
| 2015/0117869 A1 | 4/2015 | Wakayama et al. |
| 2017/0026565 A1 | 1/2017 | Hong et al. |
| 2020/0124852 A1* | 4/2020 | Zhou .................. G02C 7/081 |

FOREIGN PATENT DOCUMENTS

| | | |
|---|---|---|
| CN | 108089331 A | 5/2018 |
| CN | 111562840 A | 8/2020 |

OTHER PUBLICATIONS

CN202010344312.X first office action.
CN202010344312.X Notification to grant patent right for invention.

* cited by examiner

WEARABLE DISPLAY DEVICE AND METHOD FOR ADJUSTING IMAGING SURFACE THEREOF

CROSS-REFERENCE TO RELATED APPLICATION

This application is a U.S. national stage of international application No. PCT/CN2021/079730, filed on Mar. 9, 2021, which claims priority to Chinese Patent Application No. 202010344312.X, filed on Apr. 27, 2020 and entitled "WEARABLE DISPLAY DEVICE AND METHOD FOR ADJUSTING IMAGING FACE OF WEARABLE DISPLAY DEVICE," and the disclosures of which are herein incorporated by references in their entireties.

TECHNICAL FIELD

The present disclosure relates to the field of virtual reality technologies, and in particular, to a wearable display device and a method for adjusting an imaging face of the wearable display device.

BACKGROUND

A virtual reality (VR) device refers to a device that users may immerse users in a virtual environment created by displayed images.

SUMMARY

The present disclosure provides a wearable display device and a method for adjusting an imaging face of the wearable display device. The technical solutions are as follows.

In one aspect, a wearable display device is provided. The wearable display device includes: a motor, a processor, and a motor drive assembly, wherein the processor is connected to the motor drive assembly, and is configured to receive a motor control instruction and send the motor control instruction to the motor drive assembly, wherein the motor control instruction carries at least one of a rotation mode and a speed control parameter;

the motor drive assembly is connected to the motor and is configured to:

control the motor to rotate based on the rotation mode in the case that the motor control instruction carries the rotation mode, and adjust a rotation speed of the motor based on the speed control parameter in the case that the motor control instruction carries the speed control parameter; and the motor, upon rotating, is configured to adjust a position of an imaging face of the wearable display device.

Optionally, the wearable display device further includes: a lens;

wherein the motor, upon rotating, is configured to adjust a position of the lens, such that the imaging face of the wearable display device moves.

Optionally, the processor is configured to receive the motor control instruction from a mobile terminal, wherein a communication connection is established between the mobile terminal and the wearable display device.

Optionally, the motor drive assembly includes a controller and a drive circuit, wherein the controller is configured to:

receive the motor control instruction from the processor;

determine an operation program corresponding to the rotation mode in the case that the motor control instruction carries the rotation mode, determine a mode control signal based on the operation program, and send the mode control signal to the drive circuit; and determine a speed control signal based on the speed control parameter in the case that the motor control instruction carries the speed control parameter, and send the speed control signal to the drive circuit; and the drive circuit is configured to provide a drive current to the motor based on the mode control signal and the speed control signal.

Optionally, the controller is provided with a first interface and a second interface; wherein the controller is configured to send the mode control signal to the drive circuit via the first interface; and the controller is configured to send the speed control signal to the drive circuit via the second interface.

Optionally, the speed control signal is a pulse width modulated signal; and the speed control parameter includes a first control parameter and a second control parameter;

wherein the controller is configured to adjust the frequency of the speed control signal based on the first control parameter and the second control parameter, and send the speed control signal with an adjusted frequency to the drive circuit.

Optionally, the adjusted frequency P of the speed control signal satisfies: $P=P0/[(x1+1)\times(x2+1)]$, wherein x1 represents the first control parameter, x2 represents the second control parameter, and P0 represents a reference frequency of the motor.

Optionally, the rotation mode includes one of forward rotation, reverse rotation, reciprocation, reset, and stop.

Optionally, the wearable display device includes a first motor and a second motor; and the drive circuit in the motor drive assembly includes a first drive sub-circuit and a second drive sub-circuit; wherein in the case that the rotation mode in the motor control instruction is the reciprocation, the controller is configured to:

provide a first mode control signal to the first drive sub-circuit and provide a second mode control signal to the second drive sub-circuit in the case that the first motor rotates to an initial position and the second motor rotates to the initial position; and provide the second mode control signal to the first drive sub-circuit in the case that a number of first pulses provided to the first motor is greater than or equal to a total number of first pulses in the process of rotation of the first motor from the initial position along a first direction; and provide the first mode control signal to the second drive sub-circuit in the case that a number of second pulses provided to the second motor is greater than or equal to the total number of second pulses in the process of rotation of the second motor from the initial position along a second direction;

the first drive sub-circuit is configured to control, based on the first mode control signal, the first motor to rotate along the first direction, and control, based on the second mode control signal, the first motor to rotate along the second direction; and the second drive sub-circuit is configured to control, based on the second mode control signal, the second motor to rotate along the second direction, and control, based on the first mode control signal, the second motor to rotate along the first direction;

wherein the first direction and the second direction are opposite, the total number of the first pulses is a number of pulses provided by the motor drive assembly to the first motor in the case that the first motor rotates from the initial position to an end position, and the total number of the second pulses is a number of pulses provided by the motor drive assembly to the second motor in the case that the second motor rotates from the initial position to the end position, wherein the initial position and the end position are two limit positions to which the motor rotates.

Optionally, the wearable display device further includes a signal conversion assembly, wherein the signal conversion assembly is connected to the processor via a data line; and the processor is configured to send the motor control instruction to the signal conversion assembly via the data line; and the signal conversion assembly is connected to the motor drive assembly via a universal serial bus, and is configured to send the motor control instruction to the motor drive assembly via the universal serial bus.

In another aspect, a method for adjusting an imaging face of a wearable display device is provided. The wearable display device includes a motor. The method includes:

receiving a motor control instruction, wherein the motor control instruction carries at least one of a rotation mode and a speed control parameter;

controlling the motor to rotate based on the rotation mode in the case that the motor control instruction carries the rotation mode; and adjusting the rotation speed of the motor based on the speed control parameter in the case that the motor control instruction carries the a speed control parameter;

wherein the motor, upon rotating, is configured to adjust a position of the imaging face of the wearable display device.

Optionally, receiving the control instruction includes:

receiving the motor control instruction from a mobile terminal, wherein a communication connection is established between the mobile terminal and the wearable display device.

Optionally, the motor control instruction includes the rotation mode; and controlling the motor to rotate based on the rotation mode includes:

determining an operation program corresponding to the rotation mode; and controlling the motor to operate based on the operation program.

Optionally, the motor control instruction includes the speed control parameter; the speed control parameter includes a first control parameter and a second control parameter; and adjusting the rotation speed of the motor based on the speed control parameter includes:

adjusting the rotation speed of the motor based on the first control parameter and the second control parameter, wherein an adjusted rotation speed is negatively correlated with both the first control parameter and the second control parameter.

Optionally, the adjusted rotation speed V satisfies: $V=V0/[(x1+1)\times(x2+1)]$, where x1 represents the first control parameter, x2 represents the second control parameter, and V0 represents a reference rotation speed of the motor.

Optionally, the rotation mode includes one of forward rotation, reverse rotation, reciprocation, reset, and stop.

Optionally, the wearable display device includes a first motor and a second motor; and controlling the motor to rotate based on the rotation mode in the case that the rotation mode in the motor control instruction is the reciprocation includes:

performing the following control operations cyclically:

controlling the first motor to rotate along a first direction and controlling the second motor to rotate along a second direction in the case that the first motor rotates to an initial position and the second motor rotates to the initial position;

controlling the first motor to rotate along the second direction in the case that a number of first pulses provided to the first motor is greater than or equal to the total number of the first pulses in the process of rotation of the first motor from the initial position along the first direction; and controlling the second motor to rotate along the first direction in the case that the number of second pulses provided by the motor drive assembly to the second motor is greater than or equal to the total number of the second pulses in the process of rotation of the second motor from the initial position along the second direction, wherein the first direction and the second direction are opposite, the total number of the first pulses is the number of pulses to be provided for driving the first motor to rotate from the initial position to an end position, the total number of the second pulses is the number of pulses to be provided for the second motor to rotate from the initial position to the end position, wherein the initial position and the end position are two limit positions to which the motor rotates.

In still another aspect, a non-transitory computer-readable storage medium storing instructions therein is provided. The non-transitory computer-readable storage medium, when run on a computer, causes the computer to perform the method for adjusting the imaging face of the wearable display device according to the above aspect.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages in the present disclosure, the embodiments of the present disclosure are described in detail hereinafter in combination with the accompanying drawings.

In the related art, an imaging face of a VR device may display an image and a user may watch movies or play games through the VR device. However, the function of the VR device in the related art is relatively single.

As the popularization of electronic products such as mobile terminals and computers, the myopia rate of children and adolescents is increasing. In addition, the use of the eyes at a close distance for a long time may cause that the ciliary muscles of the eyes are in a continuous contraction and tension state and cannot be fully relaxed when viewing distant objects, and it is difficult for the convex lenses in the eyes to restore to its original shape. As a result, the distant objects cannot be clearly imaged on the retinas, which causes the pseudo myopia with vision deterioration. In the related art, an eye protection instrument may be used to correct the vision of the user, which may relax the ciliary muscles and thin the lenses, and thus the vision of the user may be restored to a normal state. However, the eye protection instrument is complex in operation and relatively poor in flexibility.

Figure 1:
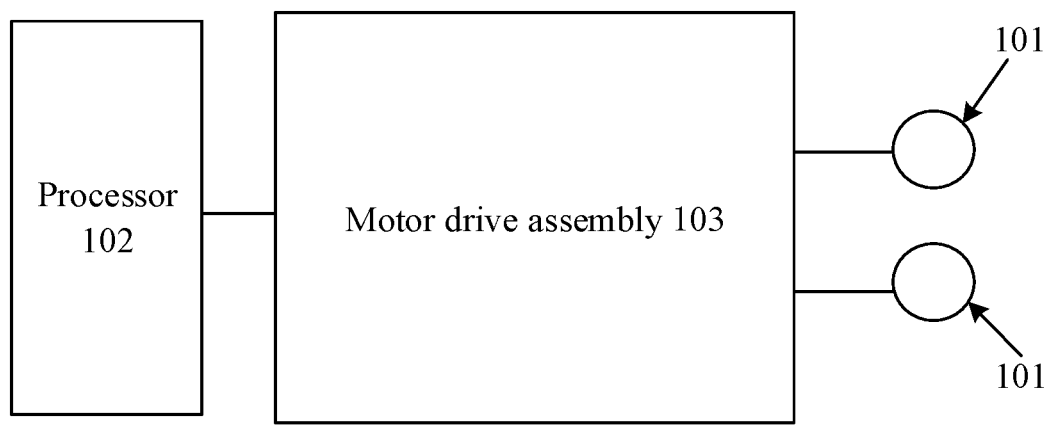
FIG. 1 is a structural schematic diagram of a wearable display device according to an embodiment of the present disclosure.

FIG. 1 is a schematic diagram of a wearable display device according to an embodiment of the present disclosure. The wearable display device can solve the problems in the related art that the function of the VR device is relatively single and the eye protection instrument is complex in operation and relatively poor in flexibility. The wearable display device 10 may be a head-mounted display device, such as a virtual reality (VR) device or an augmented reality (AR) device. With reference to FIG. 1, it can be seen that the wearable display device 10 may include a motor 101, a processor 102, and a motor drive assembly 103.

The processor 102 may be connected to the motor drive assembly 103, and may be configured to receive a motor control instruction and send the motor control instruction to the motor drive assembly 103. The motor control instruction carries at least one of a rotation mode and a speed control parameter. The rotation mode may include one of forward rotation, reverse rotation, reciprocation, reset, and stop.

The motor drive assembly 103 may be connected to the motor 101 and may be configured to control the motor 101 to rotate based on the rotation mode in the case that the motor control instruction carries the rotation mode, and adjust the rotation speed of the motor 101 based on the speed control parameter in the case that the motor control instruction carries the speed control parameter.

Illustratively, the motor drive assembly 103 may control the motor 101 to rotate forwards in the case that the rotation mode in the motor control instruction received by the processor 102 is forward rotation, and control the motor 101 to rotate reversely in the case that the rotation mode in the motor control instruction received by the processor 102 is reverse rotation.

It should be noted that after the motor drive assembly 103 drives the motor 101 to rotate, the position of an imaging face of the wearable display device may be adjusted. In addition, the movement speed of the imaging face may be positively correlated with the rotation speed of the motor. That is, in the case that the rotation speed of the motor is greater, the movement speed of the imaging face is greater, and the rotation speed of the motor is less, the movement speed of the imaging face is less.

In the embodiments of the present disclosure, the motor control instruction may be triggered by the user by performing a specified operation. Optionally, the motor control instruction received by the processor 102 may be sent by a mobile terminal to the wearable display device, and a communication connection may be established between the mobile terminal and the wearable display device 10. The specified operation may be an operation of clicking a predetermined key in the mobile terminal (such as a control key in a vision adjustment client in the mobile terminal). Alternatively, the specified operation may be a click operation, and the click operation may be an operation of clicking a predetermined key (such as a mode key or a rotating-speed adjusting key in the wearable display device); or the specified operation may be a voice operation, for example, the user speaks the voice of "slow down."

In summary, the embodiments of the present disclosure provide the wearable display device. The motor drive assembly in the wearable display device may control the motor to rotate based on the rotation mode in the motor control instruction received by the processor, or adjust the rotation speed of the motor based on the speed control parameter in the motor control instruction received by the processor. In addition, as the rotation of the motor may adjust the position of the imaging face, and the change of the position of the imaging face may cause the change of the distance between the imaging face and a user wearing the wearable display device, the wearable display device may have the function of the eye protection instrument in addition to the function of watching movies or playing games. Thus, the wearable display device has richer functions. In addition, the wearable display device is simple in operation and higher in flexibility.

Optionally, the wearable display device 10 may further include a lens barrel and a lens (not shown in the figure). The lens may be fixedly connected to the lens barrel, and the motor 101 may be rotationally connected to the lens barrel. The rotation of the motor 101 may drive the lens barrel to rotate, and the rotation of the lens barrel may drive the lens to rotate. That is, upon rotating, the motor 101 may be configured to adjust the position of the lens, and the movement of the lens may cause the movement of the imaging face. Thus, after the motor drive assembly 103 drives the motor 101 to rotate, the position of the imaging face of the wearable display device is adjusted.

In the embodiments of the present disclosure, the motor control instruction received by the processor 102 may be sent by the mobile terminal. The vision adjustment client may be disposed in the mobile terminal and may automatically determine, based on the vision of the user wearing the wearable display device, a rotation fashion (including determining the rotation mode of the motor and the rotation speed of the motor) of the motor 101. In the case that the user triggers the specified operation, the vision adjustment client may send, based on the rotation fashion, the motor control instruction to the wearable display device, and the processor 102 in the wearable display device may receive the motor control instruction. Thus, the motor drive assembly 103 may control the motor 101 to rotate based on the rotation fashion determined by the vision adjustment client, and then the imaging face of the wearable display device may move in a predetermined fashion, such that the vision of the user is improved.

It should be noted that in the case that the rotation direction of the motor 101 is different, the movement direction of the imaging face may be different. For different rotation directions of the motor 101, the movement direction of the imaging face may be predetermined in the wearable display device. For example, in the case that the motor 101 rotates forwards, the imaging face of the wearable display device may move along a direction away from the user wearing the wearable display device; and in the case that the motor 101 rotates reversely, the imaging face of the wearable display device may move along a direction close to the user wearing the wearable display device. Alternatively, in the case that the motor 101 rotates forwards, the imaging face of the wearable display device may move along the direction close to the user wearing the wearable display device; and in the case that the motor 101 rotates reversely, the imaging face of the wearable display device may move along the direction away from the user wearing the wearable display device.

Figure 2:
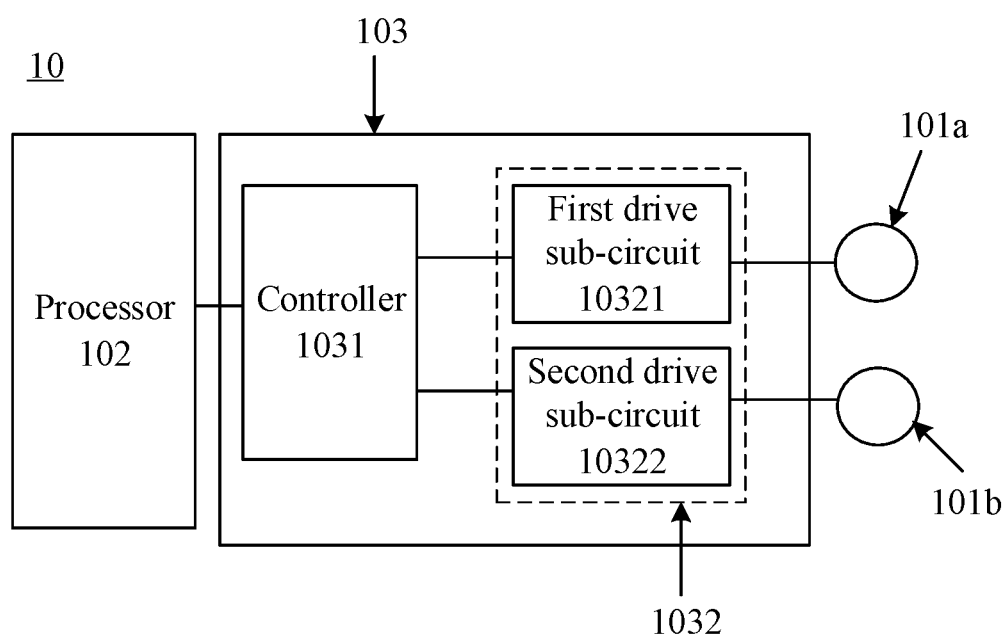
FIG. 2 is a structural schematic diagram of another wearable display device according to an embodiment of the present disclosure.

FIG. 2 is a structural schematic diagram of another wearable display device according to an embodiment of the present disclosure. With reference to FIG. 2, it can be seen that the motor drive assembly 103 may include a controller 1031 and a drive circuit 1032.

The controller 1031 may be configured to receive the motor control instruction from the processor 102.

The controller 1031 may pre-store operation programs corresponding to the rotation modes. In the case that the motor control instruction carries the rotation mode, the controller 1031 may further determine the operation program corresponding to the rotation mode in the motor control instruction, determine a mode control signal based on the operation program, and send the mode control signal to the drive circuit 1032.

The controller 1031 may further determine a speed control signal based on the speed control parameter in the case that the motor control instruction carries speed control parameter, and send the speed control signal to the drive circuit 1032.

The drive circuit 1032 may be configured to provide, based on the received mode control signal and speed control signal, a drive current to the motor 101.

Optionally, the controller 1031 may be a micro controller unit (MCU). The operation programs corresponding to the rotation modes pre-stored in the MCU may be operation programs developed by C language, C++ language, or Java language. The model of the MCU may be MCU STM32F103. The MCU may be of other models, which is not limited in the embodiments of the present disclosure.

It should be noted that the motor control instruction received by the processor 102 may include identifiers of the rotation modes, and the controller 1031 may pre-store a corresponding relationship table of the identifiers of the rotation modes and the rotation modes. After acquiring the identifier of the rotation mode in the motor control instruction from the processor 102, the controller 1031 may determine, based on the corresponding relationship table pre-stored in the controller, the rotation mode corresponding to the identifier of the rotation mode in the motor control instruction as the rotation mode required by the motor 101. The controller 1031 may then determine, based on the determined rotation mode, the operation program corresponding to the rotation mode.

As shown in FIG. 1, in the case that the identifier of the rotation mode in the motor control instruction is 0x01, the controller 1031 may determine that the rotation mode required by the motor 101 is forward rotation, and then determine the operation program corresponding to the forward rotation. In the case that the identifier of the rotation mode in the motor control instruction is 0x02, the controller 1031 may determine that the rotation mode required by the motor 101 is reverse rotation, and then determine the operation program corresponding to the reverse rotation. In the case that the identifier of the rotation mode in the motor control instruction is 0x03, the controller 1031 may determine that the rotation mode required by the motor 101 is reciprocation, and then determine the operation program corresponding to the reciprocation. In the case that the identifier of the rotation mode in the motor control instruction is 0x04, the controller 1031 may determine that the rotation mode required by the motor 101 is reset, and then determine the operation program corresponding to the reset. In the case that the identifier of the rotation mode in the motor control instruction is 0x05, the controller 1031 may determine that the rotation mode required by the motor 101 is stopping rotation, and then determine the operation program corresponding to the stopping rotation.

TABLE 1

| Identifier of rotation mode | 0x01 | 0x02 | 0x03 | 0x04 | 0x05 |
| --- | --- | --- | --- | --- | --- |
| Rotation mode | Forward rotation | Reverse rotation | Reciprocation | Reset | Stopping rotation |

With reference to FIG. 2, it can further be seen that the wearable display device 10 may include a first motor 101a and a second motor 101b. The drive circuit 1032 may include a first drive sub-circuit 10321 and a second drive sub-circuit 10322. The first drive sub-circuit 10321 may drive the first motor 101a to rotate, and the second drive sub-circuit 10322 may drive the second motor 101b to rotate.

Optionally, both the first motor 101a and the second motor 101b may be stepper motors. Correspondingly, both the first drive sub-circuit 10321 and the second drive sub-circuit 10322 may be stepper motor drivers. The model of the first drive sub-circuit 10321 may be the same as the model of the second drive sub-circuit 10322. For example, both the first drive sub-circuit 10321 and the second drive sub-circuit 10322 may be stepper motor drivers with the model of DRV8846. The model of the first drive sub-circuit 10321 may be different from the model of the second drive sub-circuit 10322, which is not limited in the embodiments of the present disclosure.

In the embodiments of the present disclosure, as the wearable display device includes two motors (the first motor 101a and the second motor 101b), the motor control instruction received by the wearable display device 10 may include the rotation mode of the first motor 101a and the rotation mode of the second motor 101b. The controller 1031 may control the first motor 101a to rotate based on the operation program determined based on the rotation mode of the first motor 101a, and control the second motor 101b to rotate based on the operation program determined based on the rotation mode of the second motor 101b. The rotation mode of the first motor 101a may be the same as the rotation mode of the second motor 101b. For example, the rotation mode of the first motor 101a and the rotation mode of the second motor 101b are reciprocation. Alternatively, the rotation mode of the first motor 101a may be different from the rotation mode of the second motor 101b. For example, the rotation mode of the first motor 101a may be the forward rotation and the rotation mode of the second motor 101b may be the reverse rotation.

Optionally, the controller 1031 may be provided with a first interface and a second interface. The controller 1031 may send the mode control signal to the drive circuit 1032 via the first interface, and send the speed control signal to the drive circuit 1032 via the second interface.

The first interface of the controller 1031 may include three first sub-interfaces and three second sub-interfaces. The controller 1031 may send, to the first drive sub-circuit 10321 via the first first sub-interface, the mode control signal configured to instruct the motor 101 to rotate forwards or reversely; send, to the first drive sub-circuit 10321 via the second first sub-interface, the mode control signal configured to instruct the motor 101 to stop rotating or start rotating; and send, to the first drive sub-circuit 10321 via the third first sub-interface, a wake-up signal configured to instruct to wake up the first drive sub-circuit 10321, or a sleep signal configured to instruct the first drive sub-circuit 10321 to sleep.

Correspondingly, the controller 1031 may send, to the second drive sub-circuit 10322 via the first second sub-interface, the mode control signal configured to instruct the motor 101 to rotate forwards or reversely; send, to the second drive sub-circuit 10322 via the second second sub-interface, the mode control signal configured to instruct the motor 101 to stop rotating or start rotating; and send, to the second drive sub-circuit 10322 via the third second sub-interface, a wake-up signal configured to instruct to wake up the second drive sub-circuit 10322, or a sleep signal configured to instruct the second drive sub-circuit 10322 to sleep.

The second interface of the controller 1031 may include a third sub-interface and a fourth sub-interface. The controller 1031 may send the speed control signal to the first drive sub-circuit 10321 via the third sub-interface, and send the speed control signal to the second drive sub-circuit 10322 via the fourth sub-interface.

In the embodiments of the present disclosure, the controller 1031 may pre-store a corresponding relationship table of identifiers of various sub-interfaces and control signals, which is shown in table 2.

TABLE 2

| Type of identifier | Identifier of a sub-interface configured to send a control signal to the first drive sub-circuit | Identifier of a sub-interface configured to send a control signal to the second drive sub-circuit | Control signal | Function |
| --- | --- | --- | --- | --- |
| Identifier of a first interface | PA3 | PB0 | 0 | Forward rotation of a motor |
| | | | 1 | Reverse rotation of the motor |
| | PA5 | PB15 | 0 | Stop of rotation of the motor |
| | | | 1 | Start of rotation of the motor |
| | PB1 | PC0 | 0 | Waking up a drive sub-circuit |
| | | | 1 | Sleep the drive sub-circuit |
| Identifier of a second interface | PA0 | PA1 | PWM signal | Rotation speed of the motor |

Reference to table 2, the controller 1031 may send the mode control signal to the first drive sub-circuit 10321 via the first first sub-interface (the interface with the identifier of PA3). The mode control signal may be a binary number "0" or "1." In the case that the sent mode control signal is "0," the first drive sub-circuit 10321 may receive the mode control signal "0," and then control the first motor 101a to rotate forwards. In the case that the sent mode control signal is "1," the first drive sub-circuit 10321 may receive the mode control signal "1," and then control the first motor 101a to rotate reversely. In addition, the controller 1031 may send the mode control signal to the second drive sub-circuit 10322 via the first second sub-interface (the interface with the identifier of PB0). The mode control signal may be the binary number "0" or "1." In the case that the sent mode control signal is "0," the second drive sub-circuit 10322 may receive the mode control signal "0," and then control the second motor 101b to rotate forwards. In the case that the sent mode control signal is "1," the second drive sub-circuit 10322 may receive the mode control signal "1," and then control the second motor 101a to rotate reversely.

The controller 1031 may send the mode control signal to the first drive sub-circuit 10321 via the second first sub-interface (the interface with the identifier of PA5). The mode control signal may be the binary number "0" or "1." In the case that the sent mode control signal is "0," the first drive sub-circuit 10321 may receive the mode control signal "0," and then control the first motor 101a to stop rotating. In the case that the sent mode control signal is "1," the first drive sub-circuit 10321 may receive the mode control signal "1," and then control the first motor 101a to start rotating. In addition, the controller 1031 may send the mode control signal to the second drive sub-circuit 10322 via the second second sub-interface (the interface with the identifier of PB15). The mode control signal may be the binary number "0" or "1." In the case that the sent mode control signal is "0," the second drive sub-circuit 10322 may receive the mode control signal "0," and then control the second motor 101b to stop rotating. In the case that the sent mode control signal is "1," the second drive sub-circuit 10322 may receive the mode control signal "1," and then control the second motor 101a to start rotating.

The controller 1031 may send the mode control signal to the first drive sub-circuit 10321 via the third first sub-interface (the interface with the identifier of PB1). The mode control signal may be the binary number "0" or "1." In the case that the sent mode control signal is "0," the first drive sub-circuit 10321 may receive the mode control signal "0," and then the first drive sub-circuit 10321 is woken up. In the case that the sent mode control signal is "1," the first drive sub-circuit 10321 may receive the mode control signal "1," and then the first drive sub-circuit 10321 sleeps. The controller 1031 may send the mode control signal to the second drive sub-circuit 10322 via the third second sub-interface (the interface with the identifier of PC0). The mode control signal may be the binary number "0" or "1." In the case that the sent mode control signal is "0," the second drive sub-circuit 10322 may receive the mode control signal "0," and then the second drive sub-circuit 10322 is woken up. In the case that the sent mode control signal is "1," the second drive sub-circuit 10322 may receive the mode control signal "1," and then the second drive sub-circuit 10322 sleeps.

The controller 1031 may further send the speed control signal to the first drive sub-circuit 10321 via the third sub-interface (the interface with the identifier of PA0). The speed control signal may be a pulse width modulated (PWM) signal. The first drive sub-circuit 10321 may then adjust the rotation speed of the first motor 101a based on the frequency of the PWM signal. Moreover, the controller 1031 may further send the speed control signal (the PWM signal) to the second drive sub-circuit 10322 via the fourth sub-interface (the interface with the identifier of PA1), and the second drive sub-circuit 10322 may then adjust the rotation speed of the second motor 101b based on the frequency of the PWM signal.

In the embodiments of the present disclosure, the speed control parameter may include a first control parameter and a second control parameter. The controller 1031 may be configured to adjust the frequency of the speed control signal based on the first control parameter and the second control parameter, and send the speed control signal with an adjusted frequency to the drive circuit 1032, such that the drive circuit 1032 controls the motor 101 to rotate based on the speed control signal with the adjusted frequency.

Optionally, the adjusted frequency P of the speed control signal may satisfy:

$$P=P0/[(x1+1)\times(x2+1)].$$

x1 is the first control parameter, x2 is the second control parameter, and P0 is a reference frequency of the motor 101. The reference frequency may be a fixed frequency pre-stored in the controller 1031 of the wearable display device. For example, the reference frequency may be acquired by dividing the frequency of a system clock of the wearable display device, and may be 36 MHz or 72 MHz. In the embodiments of the present disclosure, the controller 1031 may take the adjusted frequency P of the speed control signal as the adjusted rotation speed of the motor 101. That is, the controller may control the motor 101 to rotate with the frequency P.

Optionally, the speed control parameter may also include the duty ratio of the PWM signal. The duty ratio of the PWM signal may refer to a ratio of the duration of a pulse to a total duration of a cycle within one cycle. The magnitude of the drive current provided by the drive circuit 1032 to the motor 101 may be positively correlated with the duty ratio of the PWM signal. That is, in the case that the duty ratio of the PWM signal is greater, the drive current provided by the drive circuit 1032 to the motor 101 is greater; and in the case that the duty ratio of the PWM signal is less, and the drive current provided by the drive circuit 1032 to the motor 101 is less. Therefore, the controller 1031 may adjust the drive current provided by the drive circuit 1032 to the motor 101 based on the duty ratio of the PWM signal. Moreover, in the case that the drive current is greater, the maximum rotation speed, at which the motor 101 is drivable by the drive circuit 1032, is greater; and in the case that the drive current is less, the maximum rotation speed, at which the motor 101 to rotate is drivable by the drive circuit 1032, is less.

In the embodiments of the present disclosure, in the case that the rotation mode in the motor control instruction is the forward rotation of the motor or the reverse rotation of the motor, the motor control instruction may further include a step size parameter configured to represent a number of pulses required to be provided to the motor 101 by the drive circuit 1032. In addition, the controller 1031 may count pulses provided by the drive circuit 1032 to the motor 101 during the rotation of the motor 101. In the case that the controller 1031 determines that the number of pulses provided by the drive circuit 1032 to the motor 101 is greater than or equal to the number of pulses required to be provided to the motor 101 by the drive circuit 1032, the controller 1031 provides a stop signal to the drive circuit 1032. The drive circuit 1032 is configured to control the motor 101 to stop rotating based on the stop signal.

In the embodiments of the present disclosure, the wearable display device may include two display screens. Correspondingly, the wearable display device may be provided with two imaging faces, and the user may see images displayed by the two imaging faces through the two screens of the wearable display device. For example, the user may see, with the left eye, the image displayed by the left imaging face through the left screen of the wearable display device, and see, with the right eye, the image displayed by the right imaging face through the right screen of the wearable display device. Upon rotating, the first motor 101a may be configured to adjust the position of the first imaging face (such as the left imaging face) of the wearable display device, and upon rotating, the second motor 101b may be configured to adjust the position of the second imaging face (such as the right imaging face) of the wearable display device.

In the case that the rotation directions of the first motor and the second motor are opposite, the first imaging face and the second imaging face may move along the same direction, that is, both the first imaging face and the second imaging face move along the direction close to the user wearing the wearable display device or along the direction away from the user wearing the wearable display device. In the case that the rotation directions of the first motor and the second motor are the same, the first imaging face and the second imaging face move along opposite directions. That is, the first imaging face moves along the direction close to the user wearing the wearable display device, and the second imaging face moves along the direction away from the user wearing the wearable display device. Or the first imaging face moves along the direction away from the user wearing the wearable display device, and the second imaging face moves along the direction close to the user wearing the wearable display device.

It should be noted that, for the scenario that the wearable display device includes two display screens, the wearable display device may include two lens barrels and two lenses. The first lens may be fixedly connected to the corresponding first lens barrel, and the first motor 101a may be rotationally connected to the first lens barrel. The rotation of the first motor 101a may drive the first lens barrel to rotate, and the rotation of the first lens barrel may drive the first lens to rotate. That is, upon rotating, the first motor 101*a* may be configured to adjust the position of the first lens, and the movement of the first lens may cause the movement of the first imaging face. The second lens may be fixedly connected to the corresponding second lens barrel, and the second motor 101*b* may be rotationally connected to the second lens barrel. The rotation of the second motor 101*b* may drive the second lens barrel to rotate, and the rotation of the second lens barrel may drive the second lens to rotate. That is, upon rotating, the second motor 101*b* may be configured to adjust the position of the second lens, and the movement of the second lens may cause the movement of the second imaging face.

In the embodiments of the present disclosure, in the case that the rotation mode in the motor control instruction received by the processor 102 is the reciprocation, the controller 1031 may be configured to provide a first mode control signal to the first drive sub-circuit 10321 and provide a second mode control signal to the second drive sub-circuit 10322 in the case that the first motor 101*a* rotates to an initial position and the second motor 101*b* rotates to the initial position.

In addition, the controller 1031 may count first pulses provided to the first motor 101*a* in the process of the rotation of the first motor 101*a* from the initial position to an end position; and provide the second mode control signal to the first drive sub-circuit 10321 in the case that the number of the first pulses provided to the first motor 101*a* is greater than or equal to the total number of the first pulses in the process of the rotation of the first motor from the initial position along a first direction. In addition, the controller 1031 may further count second pulses provided to the second motor 101*b* in the process of the rotation of the second motor 101*b* from the initial position to the end position; and provide the first mode control signal to the second drive sub-circuit 10322 in the case that the number of the second pulses provided to the second motor 101*b* is greater than or equal to the total number of the second pulses in the process of the rotation of the second motor 101*b* from the initial position along a second direction.

The first direction may be opposite to the second direction. The total number of the first pulses may be the number of pulses provided by the first drive sub-circuit 10321 in the motor drive assembly 103 to the first motor 101*a* in the case that the first motor 101*a* rotates from the initial position to the end position, and the total number of the second pulses may be the number of pulses provided by the second drive sub-circuit 10322 in the motor drive assembly 103 to the second motor 101*b* in the case that the second motor 101*b* rotates from the initial position to the end position. The initial position and the end position may be two limit positions to which the motor rotates.

Optionally, the total number of the first pulses and the total number of the second pulses may both be 25245. The total number of the first pulses and the total number of the second pulses may further be other values, which is not limited in the embodiments of the present disclosure.

The first drive sub-circuit 10321 may be configured to control, based on the first mode control signal, the first motor 101*a* to rotate along the first direction, and control, based on the second mode control signal, the first motor 101*a* to rotate along the second direction.

The second drive sub-circuit 10322 may be configured to control, based on the second mode control signal, the second motor 101*b* to rotate along the second direction, and control, based on the first mode control signal, the second motor 101*b* to rotate along the first direction.

Illustratively, assuming that the rotation of the motor 101 along the first direction is the forward rotation and the rotation of the motor 101 along the second direction is the reverse rotation, the controller 1031 may be configured to provide the first mode control signal "0" to the first drive sub-circuit 10321 via the first first sub-interface (the interface with the identifier of PA3) in the case that the first motor 101*a* rotates to the initial position and the second motor 101*b* rotates to the initial position, such that the first drive sub-circuit 10322 controls, based on the first mode control signal "0," the first motor 101*a* to rotate forwards. In addition, the controller 1031 may send the second mode control signal "1" to the second drive sub-circuit 1032 via the first second sub-interface (the interface with the identifier of PB0), such that the second drive sub-circuit 1032 controls, based on the second mode control signal "1," the second motor 101*b* to rotate reversely.

Furthermore, in the process of the rotation of the first motor 101*a* from the initial position along the first direction (that is, the first motor 101*a* rotates forwards), in the case that the controller determines that the number of the first pulses provided to the first motor 101*a* is greater than or equal to the total number of the first pulses (that is, the first motor 101*a* has rotated from the initial position to the end position), the controller 1031 may provide the second mode control signal "1" to the first drive sub-circuit 10321 via the first first sub-interface (the interface with the identifier of PA3), such that the first drive sub-circuit 10321 controls, based on the second mode control signal "1," the first motor 101*a* to rotate reversely.

In the process of the rotation of the second motor 101*b* rotates from the initial position along the second direction (that is, the second motor 101*b* rotates reversely), in the case that the controller 1031 determines that the number of the second pulses provided to the second motor 101*b* is greater than or equal to the total number of the second pulses (that is, the second motor 101*b* has rotated from the initial position to the end position), the controller 1031 may provide the first mode control signal "0" to the second drive sub-circuit 10322 via the first second sub-interface (the interface with the identifier of PB0), such that the second drive sub-circuit 10322 controls, based on the first mode control signal "0," the second motor 101*b* to rotate forwards.

As during the reciprocation, the controller 1031 may control the first motor 101*a* and the second motor 101*b* to rotate along opposite directions, that is, the controller may cause the first imaging face and the second imaging face move along the same direction, such that images viewed by the user through the first imaging face and the second imaging face are the same.

Figure 3:
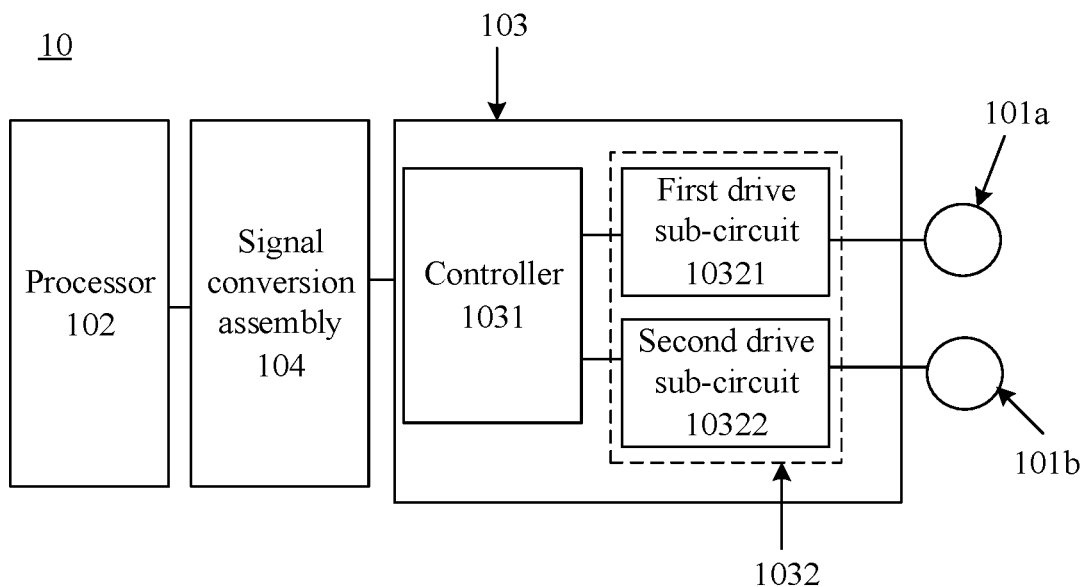
FIG. 3 is a structural schematic diagram of still another wearable display device according to an embodiment of the present disclosure.

FIG. 3 is a structural schematic diagram of still another wearable display device according to an embodiment of the present disclosure. With reference to FIG. 3, it can be seen that the wearable display device may further include a signal conversion assembly 104. The signal conversion assembly 104 may be connected to the processor 102 via a data line, and the processor 102 may be configured to send the motor control instruction to the signal conversion assembly 104 via the data line. The signal conversion assembly 104 may be connected to the motor drive assembly 103 via a universal serial bus (USB), and may be configured to send the motor control instruction to the motor drive assembly 103 via the USB.

Optionally, the signal conversion assembly 104 may send the motor control instruction to the motor drive assembly 103 via the USB 2.0 3V3. The theoretical transmission speed of the USB 2.0 3V3 is 60 MB/s (megabyte per second).

In the embodiments of the present disclosure, the signal conversion assembly 104 may further be configured to receive a display signal, and drive, based on the display signal, a display screen of the wearable display device 10 to emit light. In addition, the display signal received by the signal conversion assembly 104 may be a display port (DP) signal, and the signal conversion assembly 104 may convert the DP signal to a mobile industry processor interface (MIPI) signal, and send the MIPI signal to the controller 1031, such that the controller 1031 controls the display screen to emit light. Thus, the user may see the image displayed by the imaging face through the display screen.

The signal conversion assembly 104 may include a bridge plate and a power module disposed on the bridge plate, and the power module may supply power to the controller 1031.

Figure 4:
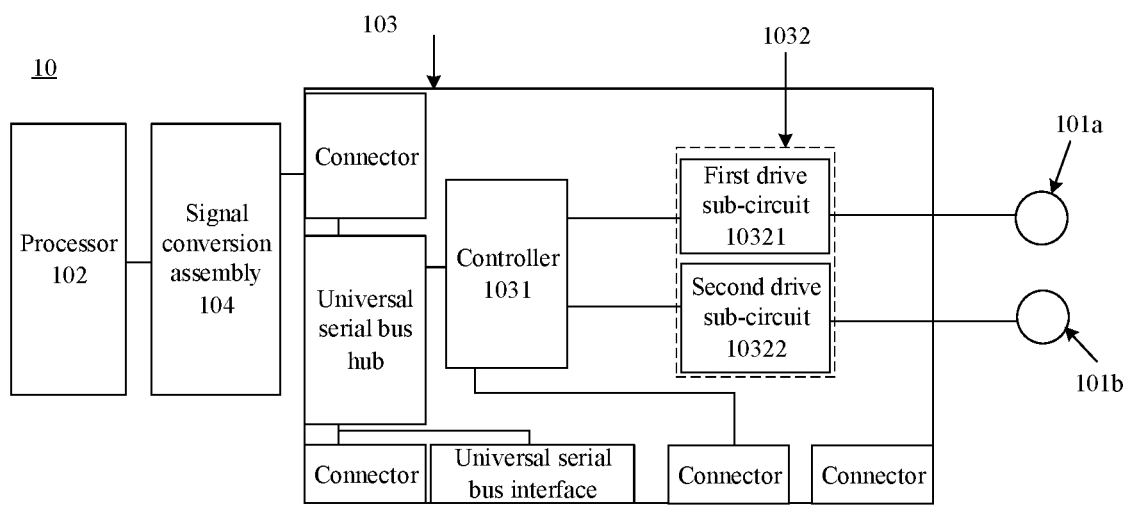
FIG. 4 is a structural schematic diagram of yet still another wearable display device according to an embodiment of the present disclosure.

FIG. 4 is a structural schematic diagram of yet still another wearable display device according to an embodiment of the present disclosure. With reference to FIG. 4, it can be seen that the wearable display device may further include a USB hub and a connector. Both the USB hub and the connector may be configured to extend peripherals. For example, the USB hub and the connector may be configured to connect a camera, a sensor, and an audio playing device, such that the wearable display device may transmit data to other devices. In addition, the USB hub may also be provided with a universal serial bus interface, and the universal serial bus interface may be configured to connect other devices in the wearable display device.

In summary, the embodiments of the present disclosure provide the wearable display device. The motor drive assembly in the wearable display device may control the motor to rotate based on the rotation mode in the motor control instruction received by the processor, or adjust the rotation speed of the motor based on the speed control parameter in the motor control instruction received by the processor. In addition, as the rotation of the motor may adjust the position of the imaging face, and the change in the position of the imaging face may cause the change of the distance between the imaging face and the user wearing the wearable display device, the wearable display device may have the function of the eye protection instrument in addition to the function of watching movies or playing games. Thus, the wearable display device has richer functions. In addition, the wearable display device is simple in operation and higher in flexibility.

Figure 5:
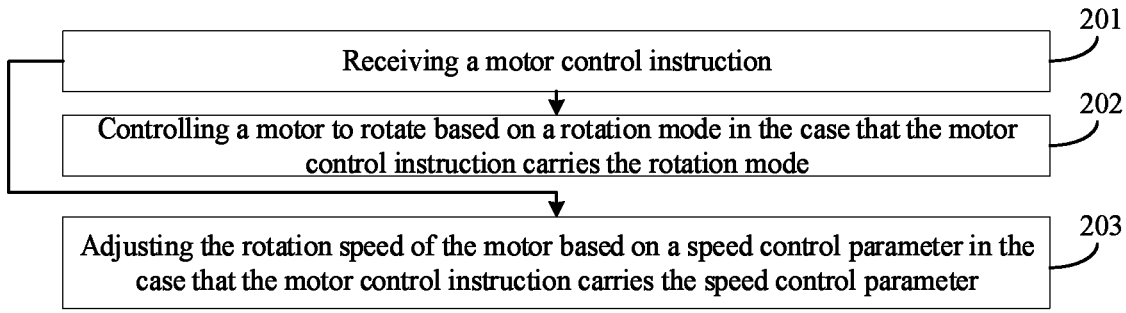
FIG. 5 is a flowchart of a method for adjusting an imaging face of a wearable display device according to an embodiment of the present disclosure.

FIG. 5 is a flowchart of a method for adjusting an imaging face of a wearable display device according to an embodiment of the present disclosure. The method may be applicable to the wearable display device 10 according to the above embodiments. With reference to FIG. 5, the method may include the following steps.

In S201, a motor control instruction is received.

In the embodiments of the present disclosure, an image may be displayed by the imaging face of the wearable display device. The user may wear the wearable display device to view the image displayed by the imaging face. In addition, upon wearing the wearable display device, the user may perform a specified operation to trigger the motor control instruction. In this case, the wearable display device may receive the motor control instruction.

The motor control instruction carries at least one of a rotation mode and a speed control parameter. The rotation mode may include one of forward rotation, reverse rotation, reciprocation, reset, and stop.

Optionally, the motor control instruction may be sent by the mobile terminal to the wearable display device, and a communication connection may be established between the mobile terminal and the wearable display device. The specified operation may be an operation of clicking a predetermined key in the mobile terminal (such as a control key in a vision adjustment client in the mobile terminal) Alternatively, the specified operation may be a click operation, and the click operation may be an operation of clicking a predetermined key (such as a mode key or a rotating-speed adjusting key in the wearable display device); or the specified operation may be a voice operation, for example, the user speaks the voice of "slow down."

In S202, the motor is controlled to rotate based on the rotation mode in the case that the motor control instruction carries the rotation mode.

In the embodiments of the present disclosure, in the case that the motor control instruction received by the wearable display device carries the rotation mode, the wearable display device may control the motor to rotate based on the rotation mode in the motor control instruction.

Illustratively, in the case that the rotation mode in the motor control instruction received by the wearable display device is the forward rotation, the wearable display device may control the motor to rotate forwards. In the case that the rotation mode in the motor control instruction received by the wearable display device is the reciprocation, the wearable display device may control the motor to perform reciprocation.

In S203, the rotation speed of the motor is adjusted based on the speed control parameter in the case that the motor control instruction carries the speed control parameter.

In the embodiments of the present disclosure, in the case that the motor control instruction received by the wearable display device carries the speed control parameter, the wearable display device may adjust the rotation speed of the motor based on the speed control parameter. That is, the wearable display device may control the motor to rotate with the rotation speed determined based on the speed control parameter.

It should be noted that the wearable display device may further include a lens barrel and a lens. The lens may be fixedly connected to the lens barrel, and the motor may be rotationally connected to the lens barrel. The rotation of the motor may drive the lens barrel to rotate, and the rotation of the lens barrel may drive the lens to rotate. That is, upon rotating, the motor may be configured to adjust the position of the lens, and the movement of the lens may cause the movement of the imaging face. That is, upon rotating, the motor may adjust the position of the imaging face of the wearable display device.

It should be noted that S202 and S203 may be performed in any order, and are merely two manners in which the wearable display device controls the motor to rotate. In the case that the motor control instruction merely includes the rotation mode, the wearable display device may control the motor to rotate based on the rotation mode in the motor control instruction, and the rotation speed of the motor may be the rotation speed of the motor before receiving the motor control instruction. In the case that the motor control instruction merely includes the speed control parameter, the wearable display device may adjust the rotation speed of the motor based on the speed control parameter, and the rotation mode of the motor may be the rotation mode of the motor before receiving the motor control instruction. In the case that the motor control instruction carries the rotation mode and the speed control parameter, the wearable display device may control the motor to rotate based on the rotation mode in the motor control instruction, and adjust the rotation speed of the motor based on the speed control parameter in the motor control instruction.

In summary, the embodiments of the present disclosure provide the method for adjusting the imaging face of the wearable display device. The motor in the wearable display device can rotate based on the rotation mode in the motor control instruction, or rotate with the rotation speed determined based on the speed control parameter in the motor control instruction. As the rotation of the motor may adjust the position of the imaging face, and the change of the position of the imaging face may cause the change of the distance between the imaging face and the user wearing the wearable display device. Therefore, by the adjusting method according to the embodiments of the present disclosure, the wearable display device may have the function of the eye protection instrument in addition to the function of watching movies or playing games. Thus, the wearable display device has richer functions. In addition, the wearable display device is simple in operation and higher in flexibility.

Figure 6:
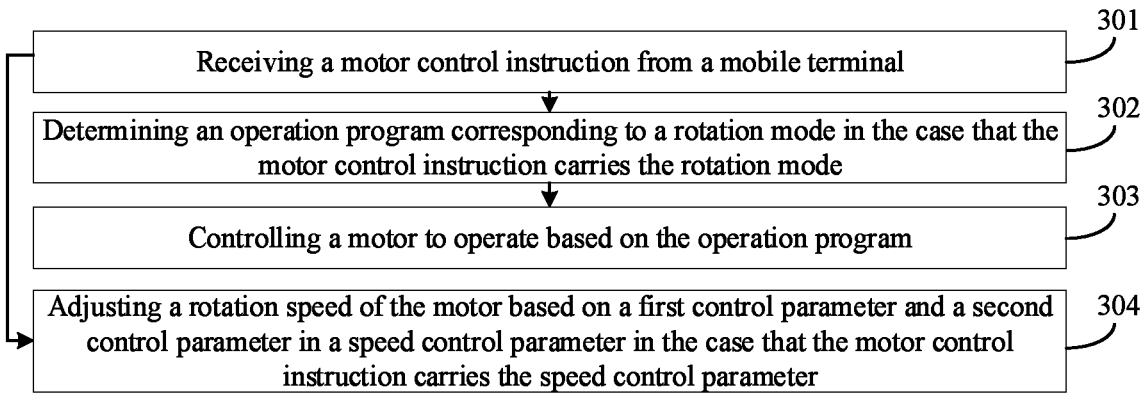
FIG. 6 is a flowchart of another method for adjusting an imaging face of a wearable display device according to an embodiment of the present disclosure.

FIG. 6 is a flowchart of another method for adjusting an imaging face of a wearable display device according to an embodiment of the present disclosure. The method may be applicable to the wearable display device 10 according to the above embodiments. With reference to FIG. 6, it can be seen that the method may include the following steps.

In S301, a motor control instruction from a mobile terminal is received.

In the embodiments of the present disclosure, an image may be displayed by the imaging face of the wearable display device. The user may wear the wearable display device to view the image displayed by the imaging face. In addition, upon wearing the wearable display device, the user may perform a specified operation in a vision adjustment client in the mobile terminal to trigger the motor control instruction. In this case, the wearable display device may receive the motor control instruction.

A communication connection may be established between the mobile terminal and the wearable display device. The motor control instruction carries at least one of a rotation mode and a speed control parameter. The rotation mode may include one of forward rotation, reverse rotation, reciprocation, reset, and stop.

It should be noted that the vision adjustment client may be disposed in the mobile terminal, and may automatically determine, based on the vision of the user wearing the wearable display device, a rotation fashion (the rotation mode and the rotation speed) of the motor 101. In the case that the user triggers the specified operation, the vision adjustment client may send, based on the rotation fashion, the motor control instruction to the wearable display device, such that the wearable display device may control the motor to rotate based on the rotation fashion determined by the vision adjustment client, and then the imaging face of the wearable display device may move in a predetermined fashion. Therefore, the vision of the user is improved.

In S302, an operation program corresponding to the rotation mode is determined in the case that the motor control instruction carries the rotation mode.

In the embodiments of the present disclosure, the controller in the wearable display device may pre-store the operation programs corresponding to the rotation modes. Upon receiving the motor control instruction, the wearable display device may determine whether the motor control instruction carries the rotation mode; and determine the corresponding operation program based on the rotation mode in the motor control instruction in the case that the motor control instruction carries the rotation mode. Thus, the wearable display device controls the motor to operate based on the operation program.

In S303, the motor is controlled to operate based on the operation program.

Upon determining the operation program corresponding to the rotation mode, the wearable display device may control, based on the determined operation program, the motor to rotate.

In the case that the determined operation program is an operation program corresponding to the forward rotation, the wearable display device may control the motor to rotate forwards, and the imaging face of the wearable display device may move along a first target direction. The first target direction may be a direction close to the user wearing the wearable display device or a direction away from the user wearing the wearable display device. In the case that the determined operation program is an operation program corresponding to the reverse rotation, the wearable display device may control the motor to rotate reversely, and the imaging face of the wearable display device may move along a second target direction. The second target direction is opposite to the first target direction. In the case that the determined operation program is an operation program corresponding to the reciprocation, the wearable display device may control the motor to perform reciprocation, that is, the imaging face of the wearable display device may perform reciprocation movement. In the case that the determined operation program is an operation program corresponding to the reset, the wearable display device may control the motor to rotate to the initial position, that is, the imaging face of the wearable display device moves to the initial position. In the case that the determined operation program is an operation program corresponding to the stopping rotation, the wearable display device may control the motor to stop rotating, that is, the imaging face of the wearable display device stays at a current position.

In the embodiments of the present disclosure, the wearable display device may include two display screens. Correspondingly, the wearable display device may be provided with two imaging faces, and the user may see images displayed by the two imaging faces through the two screens of the wearable display device. For example, the user may see, with the left eye, the image displayed by the left imaging face through the left screen of the wearable display device, and see, with the right eye, the image displayed by the right imaging face through the right screen of the wearable display device. The wearable display device may include a first motor and a second motor. Upon rotating, the first motor may be configured to adjust the position of the first imaging face (such as the left imaging face) of the wearable display device, and upon rotating, the second motor may be configured to adjust the position of the second imaging face (such as the right imaging face) of the wearable display device.

In the case that the rotation directions of the first motor and the second motor are opposite, the first imaging face and the second imaging face may move along the same direction, that is, the first imaging face and the second imaging face both move along the direction close to the user wearing the wearable display device or move along the direction away from the user wearing the wearable display device. In the case that the rotation directions of the first motor and the second motor are the same, the first imaging face and the second imaging face move along the opposite directions. That is, the first imaging face moves along the direction close to the user wearing the wearable display device, and the second imaging face moves along the direction away from the user wearing the wearable display device. Or, the first imaging face moves along the direction away from the user wearing the wearable display device, and the second imaging face moves along the direction close to the user wearing the wearable display device.

Figure 7:
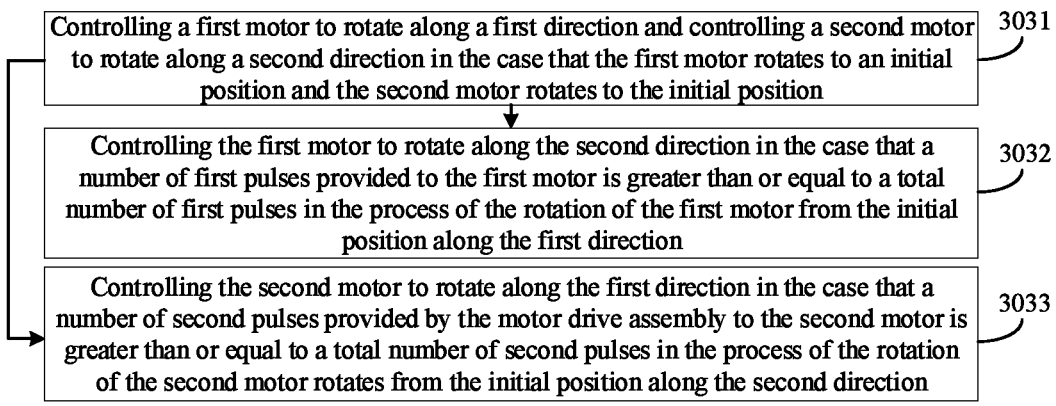
FIG. 7 is a flowchart of a method for controlling a motor to operate based on an operation program according to an embodiment of the present disclosure.

In the embodiments of the present disclosure, in the case that the operation program of the first motor and the second motor is the operation program corresponding to the reciprocation, with reference to FIG. 7, the wearable display device may perform S3031 to S3033 hereinafter based on the operation program.

In S3031, the first motor is controlled to rotate along the first direction and the second motor is controlled to rotate along the second direction in the case that the first motor rotates to an initial position and the second motor rotates to the initial position.

In the embodiments of the present disclosure, in the case that the rotation mode of the first motor and the rotation mode of the second motor in the motor control instruction received by the wearable display device are both reciprocation, the wearable display device may firstly reset the first motor and the second motor, that is, the wearable display device may firstly rotate both the first motor and the second motor to the initial position. In the case that the first motor and the second motor rotate to the initial position, the distance between the first imaging face and the user wearing the wearable display device may be equal to the distance between the second imaging face and the user wearing the wearable display device.

Illustratively, in the case that the first motor and the second motor rotate to the initial position, the distance between the first imaging face and the user wearing the wearable display device, and the distance between the second imaging face and the user wearing the wearable display device may be the minimum distance. That is, initial positions of the first imaging face and the second imaging face may be the closest positions within their movable ranges relative to the user wearing the wearable display device. Correspondingly, end positions of the first imaging face and the second imaging face may be the farthest positions within their movable ranges relative to the user wearing the wearable display device. The initial position of the imaging face and the end position of the imaging face may be two limit positions within the movable range of the imaging face.

Or, in the case that the first motor and the second motor rotate to the initial position, the distance between the first imaging face and the user wearing the wearable display device, and the distance between the second imaging face and the user wearing the wearable display device may be the maximum distance. That is, the initial positions of the first imaging face and the second imaging face may be the farthest positions within their movable ranges relative to the user wearing the wearable display device. Correspondingly, the end positions of the first imaging face and the second imaging face may be the closest positions within their movable ranges relative to the user wearing the wearable display device.

After resetting the first motor and the second motor, the wearable display device may control the first motor to rotate along the first direction and control the second motor to rotate along the second direction. The first direction and the second direction are opposite. Thus, the first imaging face and the second imaging face move along the same direction. For example, both the first imaging face and the second imaging face may move along the direction away from the user wearing the wearable display device, or the first imaging face and the second imaging face may both move along a direction close to the user wearing the wearable display device.

In S3032, the first motor is controlled to rotate along the second direction in the case that the number of the first pulses provided to the first motor is greater than or equal to the total number of the first pulses in the process of the rotation of the first motor from the initial position along the first direction.

In the embodiments of the present disclosure, the controller in the wearable display device may count the first pulses provided to the first motor in the process of the rotation of the first motor from the initial position along the first direction. In the process of the rotation of the first motor from the initial position along the first direction, in the case that the controller determines that the number of the first pulses provided to the first motor is greater than or equal to the total number of the first pulses, the first motor has rotated to the end position. In this case, the wearable display device may control the first motor to rotate along the second direction, that is, the wearable display device may control the first motor to rotate from the end position to the initial position.

The total number of the first pulses is the number of pulses to be provided for driving the first motor to rotate from the initial position to the end position. The initial position and the end position may be two limit positions to which the motor rotates.

In S3033, the second motor is controlled to rotate along the first direction in the case that the number of the second pulses provided by the motor drive assembly to the second motor is greater than or equal to the total number of the second pulses in the process of the rotation of the second motor from initial position along the second direction.

In the embodiments of the present disclosure, the controller in the wearable display device may further count the second pulses provided to the second motor in the process of the rotation of the second motor from the initial position along the second direction. In the process of the rotation of the second motor from the initial position along the second direction, in the case that the controller determines that the number of the second pulses provided to the second motor is greater than or equal to the total number of the second pulses, the second motor has rotated to the end position. In this case, the wearable display device may control the second motor to rotate along the first direction, that is, the wearable display device may control the second motor to rotate from the end position to the initial position.

The total number of the second pulses is the number of pulses to be provided for driving the second motor to rotate from the initial position to the end position.

It should be noted that, for the scenario that the wearable display device includes two display screens, the wearable display device may include two lens barrels and two lenses. The first lens may be fixedly connected to the corresponding first lens barrel, and the first motor may be rotationally connected to the first lens barrel. The rotation of the first motor may drive the first lens barrel to rotate. The second lens may be fixedly connected to the corresponding second lens barrel, and the second motor may be rotationally connected to the second lens barrel. The rotation of the second motor may drive the second lens barrel to rotate. In addition, both the first lens barrel and the second lens barrel may be provided with a shifting sheet. The wearable display device may include a first photoelectric sensor corresponding to the first lens barrel and a second photoelectric sensor corresponding to the second lens barrel. In the case that one of the first lens barrel and the second lens barrel blocks the corresponding photoelectric sensor, the photoelectric sensor may send first indication information to the controller in the wearable display device. The first indication information is configured to indicate that the motor which drives the lens barrel to rotate has rotated to the initial position.

When receiving the first indication information from the two photoelectric sensors, the controller may determine that both the first motor and the second motor rotate to the initial position. The wearable display device may again control the first motor to rotate along the first direction and control the second motor to rotate along the second direction. That is, the wearable display device enable the first motor and the second motor to rotate from the initial position to the end position again. That is, the wearable display device may cyclically perform S3031 to S3033 to realize the reciprocation of the first motor and the second motor.

It should be noted that the first motor and the second motor may both be stepper motors. The stepper motors may lose steps in the process of driving the lens barrels to rotate, such that rotations of the two lens barrels are asynchronous, and thus movements of the first imaging face and the second imaging face are asynchronous.

Figure 8:
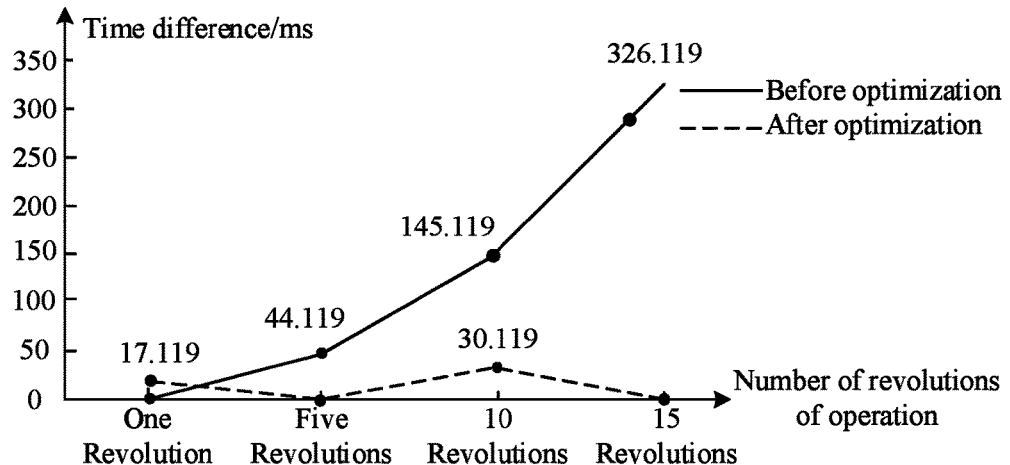
FIG. 8 is a diagram of a relationship between a number of revolutions of operation and a time difference according to an embodiment of the present disclosure.

With reference to FIG. 8, before the operation of the first motor and the second motor is optimized, the time difference between the time point at which the first motor rotates to the initial position and the time point at which the second motor rotates to the initial position is 0 ms in the case that the first motor and the second motor operate for one revolution; the time difference between the time point at which the first motor rotates to the initial position and the time point at which the second motor rotates to the initial position is 44.119 ms in the case that the first motor and the second motor operate for five revolutions; the time difference between the time point at which the first motor rotates to the initial position and the time point at which the second motor rotates to the initial position is 145.119 ms in the case that the first motor and the second motor operate for 10 revolutions; and the time difference between the time point at which the first motor rotates to the initial position and the time point at which the second motor rotates to the initial position is 326.119 ms in the case that the first motor and the second motor operate for 15 revolutions. That is, before the operation of the first motor and the second motor is optimized, when the first motor and the second motor perform the reciprocation, the time difference between the time point at which the first motor rotates to the initial position and the time point at which the second motor rotates to the initial position is greater in the case that the number of revolutions of the reciprocation is greater, and thus the error between the moving distances of the first imaging face and the second imaging face is greater. The error between the moving distances of the first imaging face and the second imaging face refers to the difference between the distance between the first imaging face and the user wearing the wearable display device and the distance between the second imaging face and the user wearing the wearable display device.

When performing reciprocation, the first motor may firstly rotate from the initial position to the end position along the first direction, and then rotate from the end position to the initial position along the second direction. Correspondingly, when performing reciprocation, the second motor may firstly rotate from the initial position to the end position along the second direction, and then rotate from the end position to the initial position along the first direction.

In the embodiments of the present disclosure, in order to make the first motor and the second motor rotate synchronously to reduce the time difference between the time point at which the first motor rotates to the initial position and the time point at which the second motor rotates to the initial position, that is, to reduce the error between the moving distances of the first imaging face and the second imaging face, the controller may control the first motor to stop rotating and control the second motor to rotate along the first direction when receiving the first indication information from the first photoelectric sensor corresponding to the first motor, and not receiving the first indication information from the second photoelectric sensor corresponding to the second motor (which indicates that the first motor has rotated to the initial position and the second motor does not rotate to the initial position). The second motor has rotated to the initial position until the controller receives the first indication information from the second photoelectric sensor corresponding to the second motor. In this case, the controller then controls the first motor to rotate along the first direction and controls the second motor to rotate along the second direction.

The controller may also control the second motor to stop rotating and control the first motor to continue to rotate along the second direction when receiving the first indication information from the second photoelectric sensor corresponding to the second motor, and not receiving the first indication information from the first photoelectric sensor corresponding to the first motor (which indicates that the second motor has rotated to the initial position and the first motor does not rotate to the initial position). The first motor has rotated to the initial position until the controller receives the first indication information from the first photoelectric sensor corresponding to the first motor. In this case, the controller may control the first motor to rotate along the first direction and control the second motor to rotate along the second direction.

That is, in the case that the controller receives the first indication information from the first photoelectric sensor corresponding to the first motor and receives the first indication information from the second photoelectric sensor corresponding to the second motor, the controller may simultaneously control the two motors to rotate along opposite directions, such that the first motor and the second motor may rotate synchronously.

Illustratively, with reference to FIG. 8, after the operation of the first motor and the second motor is optimized, the time difference between the time point at which the first motor rotates to the initial position and the time point at which the second motor rotates to the initial position is 17.119 ms in the case that the first motor and the second motor operate for 1 revolution; the time difference between the time point at which the first motor rotates to the initial position and the time point at which the second motor rotates to the initial position is 0 ms in the case that the first motor and the second motor operate for 5 revolutions; the time difference between the time point at which the first motor rotates to the initial position and the time point at which the second motor rotates to the initial position is 30.119 ms in the case that the first motor and the second motor operate for 10 revolutions; and the time difference between the time point at which the first motor rotates to the initial position and the time point at which the second motor rotates to the initial position is 0 ms in the case that the first motor and the second motor operate for 15 revolutions.

That is, after the operation of the first motor and the second motor is optimized, the time difference between the time point at which the first motor rotates to the initial position and the time point at which the second motor rotates to the initial position is less. That is, the error between operation distances of the first motor and the second motor is less. For example, after the operation of the first motor and the second motor is optimized, the error between the operation distances of the first motor and the second motor is less than 0.33 mm. The error between the operation distances of the first motor and the second motor may refer to the difference between the distance of the rotation of the first motor from a start time point to a target time point and the distance of the rotation of the second motor from the start time point to the target time point. The target time point may be any time point. As the time difference between the time point at which the first motor rotates to the initial position and the time point at which the second motor rotates to the initial position is less, the error between the moving distances of the first imaging face and the second imaging face is also less. For example, after the operation of the first motor and the second motor is optimized, the error between the moving distances of the first imaging face and the second imaging face is less than 0.32 mm.

In the embodiments of the present disclosure, in the case that the shifting sheet on one of the first lens barrel and the second lens barrel does not block the corresponding photoelectric sensor, the photoelectric sensor may further send second indication information to the controller in the wearable display device. The second indication information is configured to indicate that the motor which drives the lens barrel to rotate continues to rotate along the current direction.

Illustratively, the first indication information may be 1, and the second indication information may be 0. In the case that certain photoelectric sensor sends "1" to the controller, the controller may determine that the motor corresponding to the photoelectric sensor has rotated to the initial position. In the case that certain photoelectric sensor sends "0" to the controller, the controller may determine that the motor corresponding to the photoelectric sensor does not rotate to the initial position.

Figure 9:
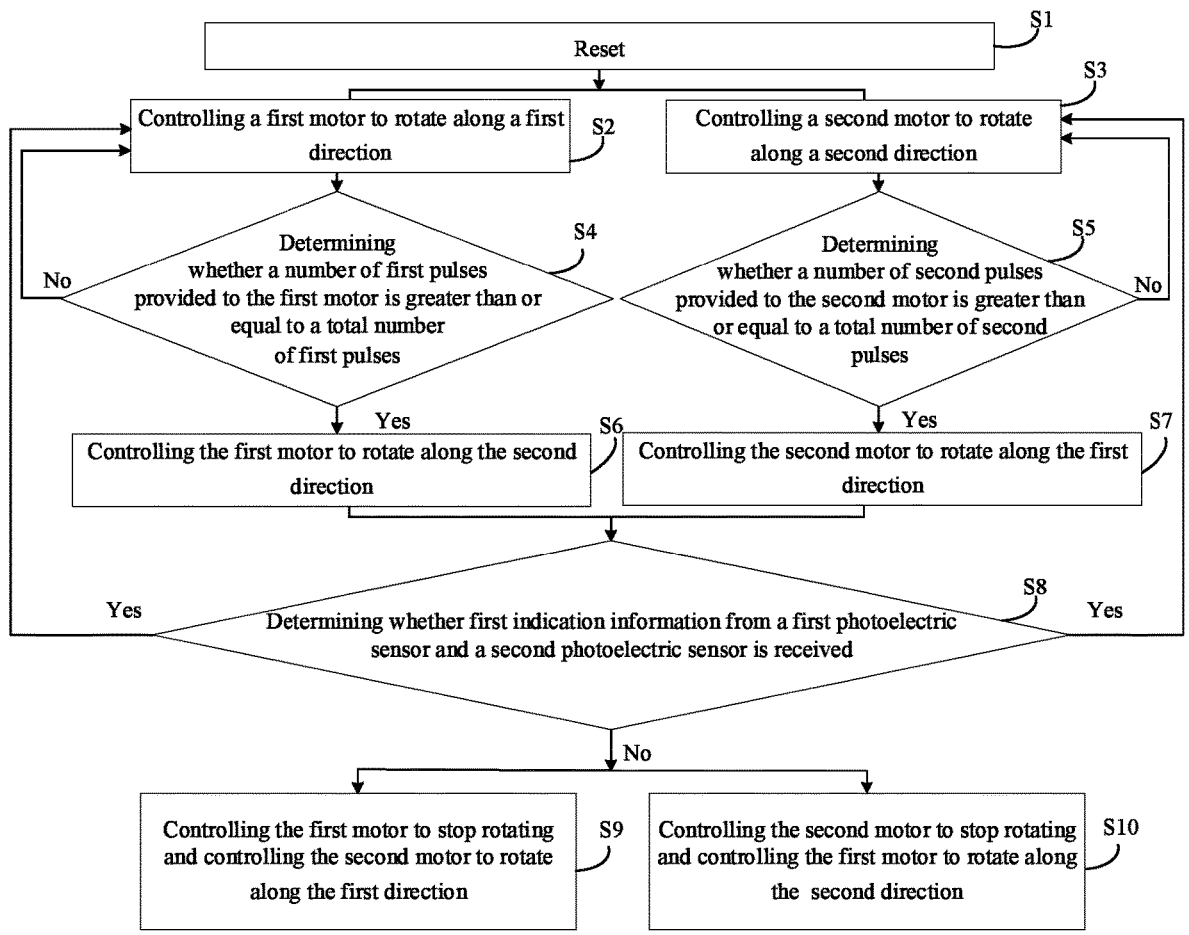
FIG. 9 is a flowchart of a method for reciprocation according to an embodiment of the present disclosure.

With reference to FIG. 9, in the case that the wearable display device determines, based on the received motor control instruction, that the operation program of the first motor and the second motor is the reciprocation, the wearable display device may perform following steps.

In S1, resetting is performed.

The wearable display device may rotate both the first motor and the second motor to the initial position.

In S2, the first motor is controlled to rotate along the first direction.

In S3, the second motor is controlled to rotate along the second direction.

In S4, whether the number of the first pulses provided to the first motor is greater than or equal to the total number of the first pulses is determined.

In the case that the number of the first pulses provided to the first motor is greater than or equal to the total number of the first pulses, S6 is performed; and in the case that the number of the first pulses provided to the first motor is less than the total number of the first pulses, S2 is performed.

In S5, whether the number of the second pulses provided to the second motor is greater than or equal to the total number of the second pulses is determined.

In the case that the number of the second pulses provided to the second motor is greater than or equal to the total number of the second pulses, S7 is performed; and in the case that the number of the second pulses provided to the second motor is less than the total number of the second pulses, S3 is performed.

In S6, the first motor is controlled to rotate along the second direction.

In S7, the second motor is controlled to rotate along the first direction.

In S8, whether the first indication information from the first photoelectric sensor and the second photoelectric sensor is received is determined.

In the case that the first indication information from the first photoelectric sensor is received and the first indication information from the second photoelectric sensor is received, S2 and S3 are performed.

In the case that the first indication information from the first photoelectric sensor is received and the first indication information from the second photoelectric sensor is not received, S9 is performed.

In the case that the first indication information from the second photoelectric sensor is received and the first indication information from the first photoelectric sensor is not received, S10 is performed.

In S9, the first motor is controlled to stop rotating, and the second motor is controlled to rotate along the first direction.

In S10, the second motor is controlled to stop rotating, and the first motor is controlled to rotate along the second direction.

It should be noted that S2 and S3 may be performed synchronously, S4 and S5 may be performed synchronously, and S6 and S7 may be performed synchronously.

In 304, the rotation speed of the motor is adjusted based on the first control parameter and the second control parameter in the speed control parameter in the case that the motor control instruction carries the speed control parameter.

In the embodiments of the present disclosure, in the case that the motor control instruction received by the wearable display device carries the speed control parameter, the controller in the wearable display device may adjust, based on the first control parameter and the second control parameter in the speed control parameter, the rotation speed of the motor. That is, the wearable display device may control the motor to rotate with the rotation speed determined based on the first control parameter and the second control parameter. The adjusted rotation speed is negatively correlated with both the first control parameter and the second control parameter.

Optionally, the adjusted rotation speed V satisfies: $V=V_0/[(x_1+1) \times (x_2+1)]$, wherein $x_1$ represents the first control parameter, $x_2$ represents the second control parameter, and $V_0$ represents a reference rotation speed of the motor.

In the embodiments of the present disclosure, the controller of the wearable display device may pre-store a fixed frequency, and the reference rotation speed $V_0$ may be determined based on the fixed frequency. For example, the fixed frequency may be determined as the reference rotation speed $V_0$. The fixed frequency may be acquired by dividing the frequency of a system clock of the wearable display device, and may be 36 MHz or 72 MHz.

In summary, the embodiments of the present disclosure provide the method for adjusting the imaging face of the wearable display device. The motor in the wearable display device can rotate based on the rotation mode in the motor control instruction, or rotate with the rotation speed determined based on the speed control parameter in the motor control instruction. As the rotation of the motor may adjust the position of the imaging face, and the change of the position of the imaging face may cause the change of the distance between the imaging face and the user wearing the wearable display device. Therefore, by the adjusting method according to the embodiments of the present disclosure, the wearable display device may have the function of the eye protection instrument in addition to the function of watching movies or playing games. Thus, the wearable display device has richer functions. In addition, the wearable display device is simple in operation and higher in flexibility.

An embodiment of the present disclosure provides a non-transitory computer-readable storage medium. The computer-readable storage medium stores an operation. The computer-readable storage medium, when run on a computer, causes the computer to perform the method for adjusting the imaging face of the wearable display device according to the above method embodiments, such as the methods shown in FIG. 5 or FIG. 6.

An embodiment of the present disclosure further provides a computer program product including instructions. A computer, when running the instructions, is caused to perform the method for adjusting the imaging face of the wearable display device according to the above method embodiments, such as the methods shown in FIG. 5 or FIG. 6.

A person of ordinary skill in the art may understand that all or part of the steps in the above embodiments may be performed through hardware, or through relevant hardware instructed by a program stored in a computer-readable storage medium, such as a read-only memory, a disk or an optical disc.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A wearable display device, comprising: a motor, a processor, and a motor drive assembly; wherein
    the processor is connected to the motor drive assembly, and is configured to receive a motor control instruction and send the motor control instruction to the motor drive assembly, wherein the motor control instruction carries at least one of a rotation mode and a speed control parameter;
    the motor drive assembly is connected to the motor, and is configured to: control the motor to rotate based on the rotation mode in the case that the motor control instruction carries the rotation mode, and adjust a rotation speed of the motor based on the speed control parameter in the case that the motor control instruction carries the speed control parameter; and
    the motor, upon rotating, is configured to adjust a position of an imaging face of the wearable display device; wherein
    the rotation mode comprises one of forward rotation, reverse rotation, reciprocation, reset, and stop, the wearable display device comprises a first motor and a second motor; and the drive circuit in the motor drive assembly comprises a first drive sub-circuit and a second drive sub-circuit; wherein in the case that the rotation mode in the motor control instruction is the reciprocation, the controller is configured to:
        provide a first mode control signal to the first drive sub-circuit and provide a second mode control signal to the second drive sub-circuit in the case that the first motor rotates to an initial position and the second motor rotates to the initial position;
        provide the second mode control signal to the first drive sub-circuit in the case that a number of first pulses provided to the first motor is greater than or equal to a total number of first pulses in the process of rotation of the first motor from the initial position along a first direction; and provide the first mode control signal to the second drive sub-circuit in the case that a number of second pulses provided to the second motor is greater than or equal to a total number of second pulses in the process of rotation of the second motor from the initial position along a second direction; and
        control the first motor to stop rotating and control the second motor to rotate along the first direction when receiving first indication information from a first photoelectric sensor corresponding to the first motor, and not receiving first indication information from a second photoelectric sensor corresponding to the second motor; control the second motor to stop rotating and control the first motor to continue to rotate along the second direction when receiving the first indication information from the second photoelectric sensor corresponding to the second motor, and not receiving the first indication information from the first photoelectric sensor corresponding to the first motor; simultaneously control the first motor and the second motor to rotate along opposite directions when receiving the first indication information from the first photoelectric sensor corresponding to the first motor and the first indication information from the second photoelectric sensor corresponding to the second motor;
    the first drive sub-circuit is configured to control, based on the first mode control signal, the first motor to rotate along the first direction, and control, based on the second mode control signal, the first motor to rotate along the second direction; and the second drive sub-circuit is configured to control, based on the second mode control signal, the second motor to rotate along the second direction, and control, based on the first mode control signal, the second motor to rotate along the first direction;
    wherein the first direction and the second direction are opposite, the total number of the first pulses is a number of pulses provided by the motor drive assembly to the first motor in the case that the first motor rotates from the initial position to an end position, and the total number of the second pulses is a number of pulses provided by the motor drive assembly to the second motor in the case that the second motor rotates from the initial position to the end position, wherein the initial position and the end position are two limit positions to which the motor rotates.

2. The wearable display device according to claim 1, further comprising: a lens;
    wherein the motor, upon rotating, is configured to adjust a position of the lens, such that that the imaging face of the wearable display device moves.

3. The wearable display device according to claim 2, wherein the processor is configured to receive the motor control instruction from a mobile terminal, wherein a communication connection is established between the mobile terminal and the wearable display device.

4. The wearable display device according to claim 1, wherein the processor is configured to receive the motor control instruction from a mobile terminal, wherein a communication connection is established between the mobile terminal and the wearable display device.

5. The wearable display device according to claim 1, wherein the motor drive assembly comprises a controller and a drive circuit; wherein
the controller is configured to: receive the motor control instruction from the processor; determine an operation program corresponding to the rotation mode in the case that the motor control instruction carries the rotation mode, determine a mode control signal based on the operation program, and send the mode control signal to the drive circuit; and determine a speed control signal based on the speed control parameter in the case that the motor control instruction comprises the speed control parameter, and send the speed control signal to the drive circuit; and
the drive circuit is configured to provide a drive current to the motor based on the mode control signal and the speed control signal.

6. The wearable display device according to claim 5, wherein the controller is provided with a first interface and a second interface; wherein
the controller is configured to send the mode control signal to the drive circuit via the first interface; and
the controller is configured to send the speed control signal to the drive circuit via the second interface.

7. The wearable display device according to claim 6, wherein the speed control signal is a pulse width modulated signal; and the speed control parameter comprises a first control parameter and a second control parameter;
wherein the controller is configured to adjust a frequency of the speed control signal based on the first control parameter and the second control parameter, and send the speed control signal with an adjusted frequency to the drive circuit.

8. The wearable display device according to claim 5, wherein the speed control signal is a pulse width modulated signal; and the speed control parameter comprises a first control parameter and a second control parameter;
wherein the controller is configured to adjust a frequency of the speed control signal based on the first control parameter and the second control parameter, and send the speed control signal with an adjusted frequency to the drive circuit.

9. The wearable display device according to claim 8, wherein the adjusted frequency P of the speed control signal satisfies: $P=P0/[(x1+1)\times(x2+1)]$,
wherein x1 represents the first control parameter, x2 represents the second control parameter, and P0 represents a reference frequency of the motor.

10. The wearable display device according to claim 1, further comprising: a signal conversion assembly; wherein
the signal conversion assembly is connected to the processor via a data line; and the processor is configured to send the motor control instruction to the signal conversion assembly via the data line; and
the signal conversion assembly is connected to the motor drive assembly via a universal serial bus, and is configured to send the motor control instruction to the motor drive assembly via the universal serial bus.

11. A method for adjusting an imaging face of a wearable display device, the wearable display device comprising a motor,
the method comprising:
receiving a motor control instruction, wherein the motor control instruction carries at least one of a rotation mode and a speed control parameter;
controlling the motor to rotate based on the rotation mode in the case that the motor control instruction carries the rotation mode; and
adjusting a rotation speed of the motor based on the speed control parameter in the case that the motor control instruction carries the speed control parameter;
wherein the motor, upon rotating, is configured to adjust a position of the imaging face of the wearable display device, the rotation mode comprises one of forward rotation, reverse rotation, reciprocation, reset, and stop, the wearable display device comprises a first motor and a second motor; and controlling the motor to rotate based on the rotation mode in the case that the rotation mode in the motor control instruction is the reciprocation comprises:
performing the following control operations cyclically:
controlling the first motor to rotate along a first direction and controlling the second motor to rotate along a second direction in the case that the first motor rotates to an initial position and the second motor rotates to the initial position;
controlling the first motor to rotate along the second direction in the case that a number of first pulses provided to the first motor is greater than or equal to a total number of first pulses in the process of rotation of the first motor from the initial position along the first direction;
controlling the second motor to rotate along the first direction in the case that a number of second pulses provided by the motor drive assembly to the second motor is greater than or equal to a total number of second pulses in the process of rotation of the second motor from the initial position along the second direction; and
controlling the first motor to stop rotating and controlling the second motor to rotate along the first direction when receiving first indication information from a first photoelectric sensor corresponding to the first motor, and not receiving first indication information from a second photoelectric sensor corresponding to the second motor; controlling the second motor to stop rotating and controlling the first motor to continue to rotate along the second direction when receiving the first indication information from the second photoelectric sensor corresponding to the second motor, and not receiving the first indication information from the first photoelectric sensor corresponding to the first motor; simultaneously controlling the first motor and the second motor to rotate along opposite directions when receiving the first indication information from the first photoelectric sensor corresponding to the first motor and the first indication information from the second photoelectric sensor corresponding to the second motor;
wherein the first direction and the second direction are opposite, the total number of the first pulses is a number of pulses to be provided for driving the first motor to rotate from the initial position to an end position, the total number of the second pulses is a number of pulses to be provided to the second motor to rotate from the initial position to the end position, wherein the initial position and the end position are two limit positions to which the motor rotates.

12. The method according to claim 11, wherein receiving the control instruction comprises:

receiving the motor control instruction from a mobile terminal, wherein a communication connection is established between the mobile terminal and the wearable display device.

13. The method according to claim 11, wherein the motor control instruction comprises the rotation mode; and controlling the motor to rotate based on the rotation mode comprises:
    determining an operation program corresponding to the rotation mode; and
    controlling the motor to operate based on the operation program.

14. The method according to claim 11, wherein the motor control instruction comprises the speed control parameter; the speed control parameter comprises a first control parameter and a second control parameter; and adjusting the rotation speed of the motor based on the speed control parameter comprises:
    adjusting the rotation speed of the motor based on the first control parameter and the second control parameter, wherein an adjusted rotation speed is negatively correlated with both the first control parameter and the second control parameter.

15. The method according to claim 14, wherein the adjusted rotation speed V satisfies: $V=V0/[(x1+1)\times(x2+1)]$, wherein x1 represents the first control parameter, x2 represents the second control parameter, and V0 represents a reference rotation speed of the motor.

16. A non-transitory computer-readable storage medium storing an instruction therein, wherein the non-transitory computer-readable storage medium, when run on a computer, causes the computer to perform the a method for adjusting an imaging face of a wearable display device, wherein the wearable display device comprises a motor, and the motor, upon rotating, is configured to adjust a position of the imaging face of the wearable display device, and wherein the method comprises:
    receiving a motor control instruction, wherein the motor control instruction carries at least one of a rotation mode and a speed control parameter;
    controlling the motor to rotate based on the rotation mode in the case that the motor control instruction carries the rotation mode; and
    adjusting a rotation speed of the motor based on the speed control parameter in the case that the motor control instruction carries the speed control parameter; wherein the rotation mode comprises one of forward rotation, reverse rotation, reciprocation, reset, and stop, the wearable display device comprises a first motor and a second motor; and controlling the motor to rotate based on the rotation mode in the case that the rotation mode in the motor control instruction is the reciprocation comprises:
    performing the following control operations cyclically:
    controlling the first motor to rotate along a first direction and controlling the second motor to rotate along a second direction in the case that the first motor rotates to an initial position and the second motor rotates to the initial position;
    controlling the first motor to rotate along the second direction in the case that a number of first pulses provided to the first motor is greater than or equal to a total number of first pulses in the process of rotation of the first motor from the initial position along the first direction;
    controlling the second motor to rotate along the first direction in the case that a number of second pulses provided by the motor drive assembly to the second motor is greater than or equal to a total number of second pulses in the process of rotation of the second motor from the initial position along the second direction; and
    controlling the first motor to stop rotating and controlling the second motor to rotate along the first direction when receiving first indication information from a first photoelectric sensor corresponding to the first motor, and not receiving first indication information from a second photoelectric sensor corresponding to the second motor; controlling the second motor to stop rotating and controlling the first motor to continue to rotate along the second direction when receiving the first indication information from the second photoelectric sensor corresponding to the second motor, and not receiving the first indication information from the first photoelectric sensor corresponding to the first motor; simultaneously controlling the first motor and the second motor to rotate along opposite directions when receiving the first indication information from the first photoelectric sensor corresponding to the first motor and the first indication information from the second photoelectric sensor corresponding to the second motor;
    wherein the first direction and the second direction are opposite, the total number of the first pulses is a number of pulses to be provided for driving the first motor to rotate from the initial position to an end position, the total number of the second pulses is a number of pulses to be provided to the second motor to rotate from the initial position to the end position, wherein the initial position and the end position are two limit positions to which the motor rotates.

* * * * *